Feb. 24, 1931.   J. V. PATTERSON   1,794,241
TRANSMISSION FOR AUTOMOBILES
Filed April 26, 1927   5 Sheets-Sheet 4

INVENTOR.
John V. Patterson
BY
ATTORNEYS.

Patented Feb. 24, 1931

1,794,241

UNITED STATES PATENT OFFICE

JOHN V. PATTERSON, OF TRENTON, NEW JERSEY, ASSIGNOR TO PATTERSON TRANS-
MISSION COMPANY, OF ANNANDALE, NEW JERSEY, A CORPORATION OF NEW
JERSEY

TRANSMISSION FOR AUTOMOBILES

Application filed April 26, 1927. Serial No. 186,675.

This invention relates to variable speed power transmission mechanism for automobiles and the like, and with respect to its more specific features, to the shifting mechanism and the mechanism for actuating and controlling the shifting mechanism.

One of the objects of the invention is the provision of a practical, compact, strong, reliably actuatable mechanical shift mechanism which is convenient and efficient in operation and by the use of which passenger accommodation is increased to advantage.

Another object of the invention is the provision of a practical, strong and efficient pedal-actuated mechanical shift mechanism which is easy and certain in operation and, while meeting the necessities which the driver of an automobile is likely to encounter, leaves both hands practically free.

Another object of the invention is the provision of a shift mechanism having a selector associated therewith by which shifting is greatly promoted and made convenient under all practical driving conditions.

Another object of the invention is the provision of a compact, strong and reliably actuating shift mechanism which may reliably and conveniently be preliminarily set by wholly mechanical means for shift to any speed, among the several provided, before effecting actual shift and while the automobile is running at any speed or is at rest.

Another object of the invention is the provision, in a vehicle of the kind referred to, of simple and practical apparatus for preliminarily mechanically setting the transmission for any desired power shift or for neutral shift; which will assure always shifting through neutral when shifting from one power position to another; and which will also assure that all the other shiftable power transmitting gears will shift to or be retained in neutral, during shift of and driving actuation by the selected gear.

Another object of the invention is the provision, in a vehicle of the kind referred to, of a practical, efficient, strong and compact arrangement of shift actuating mechanism and shift pre-selecting mechanism which will facilitate the operation of changing speed through shift mechanism, and promote safety and minimum expenditure of manual effort in so doing.

Other objects of the invention will be in part obvious and will in part appear hereinafter.

The invention accordingly comprises the features of construction, combinations of elements and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawing, in which.

Referring now more specifically to the drawings, the invention is illustrated as embodied in an automobile. The numeral 1 indicates the main frame or chassis of the automobile. The rear running wheels of the automobile are indicated at 2 and the front running wheels at 3. The numeral 4 indicates the propeller shaft through which power from the engine is communicated to the rear running wheels 2 to rotate the latter and thereby effect driving of the automobile. Supported on the chassis 1 are the floor boards 5, the numerals 6 indicating the toe board. The steering head, or column, is indicated at 7, being a sleeve stationarily mounted on the automobile. The numeral 8 indicates the tiller, or steering wheel. Passing through the tubular column 7 is a steering shaft to which the wheel 8 is affixed, rotation of the steering shaft in one direction or the other effecting movement of the arm 9, which latter, through the link 10, shifts the front wheels 3 to control the direction of movement of the automobile, all as well understood. Mounted on the chassis is an internal combustion engine which is diagrammatically indicated at 11.

Figures 2, 8:
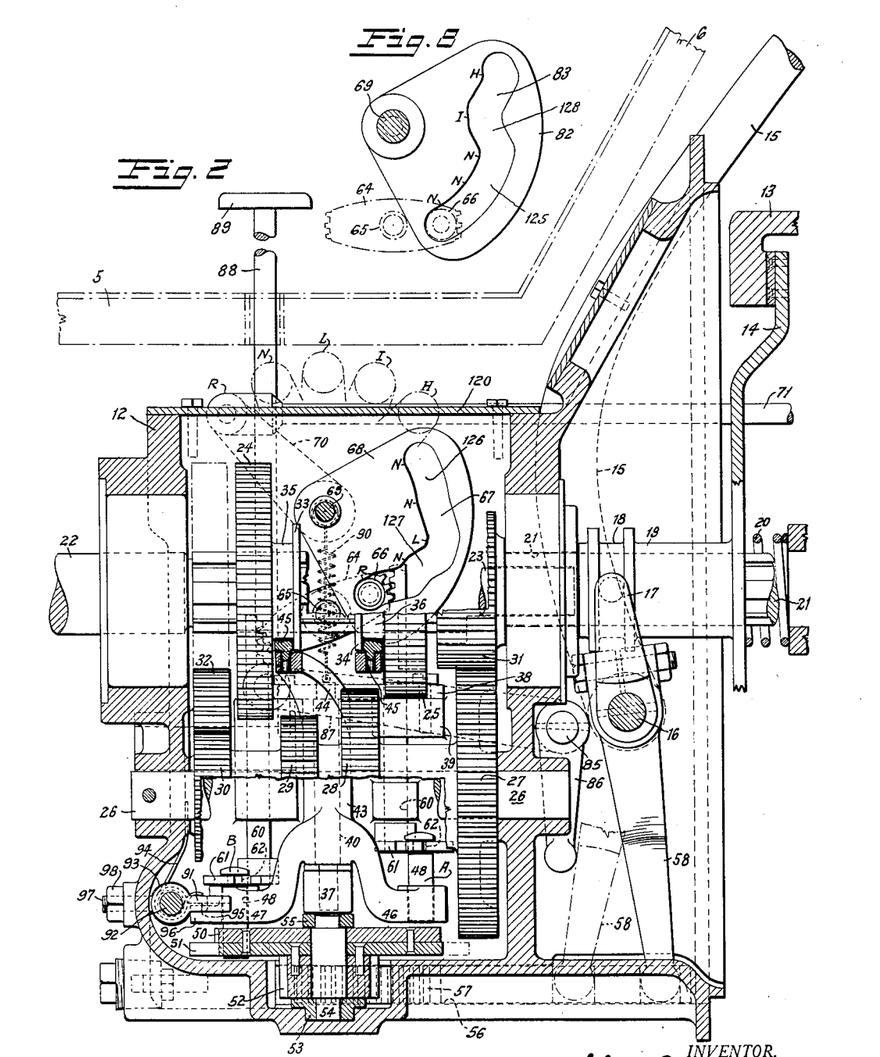
Fig. 2 illustrates the variable speed transmission in central vertical longitudinal section, the selector mechanism being in position selective of "reverse"
Fig. 8 is a detail of one of the selector control cams.

The numeral 12 indicated a casing which houses the transmission mechanism and a large part of the shift mechanism, the propeller shaft 4 being driven through the transmission mechanism. For the purpose of driving the transmission mechanism from the internal combustion engine, it will be understood that any practical type of device for controlling the application and cutting out of power from the engine to the transmission mechanism may be employed. In the embodiment illustrated, clutch elements 13 and 14 are employed, it being understood that the driving clutch element 13 is rotated from the engine shaft, and that the driven clutch element 14 is shiftable at will into and out of driving relation to the clutch element 13. A diagrammatic representation of the clutch elements 13 and 14 is illustrated in Fig. 2, the clutch element 14 being shiftable out of driving relation to the clutch element 13 by means of the main control lever 15.

Figure 1:
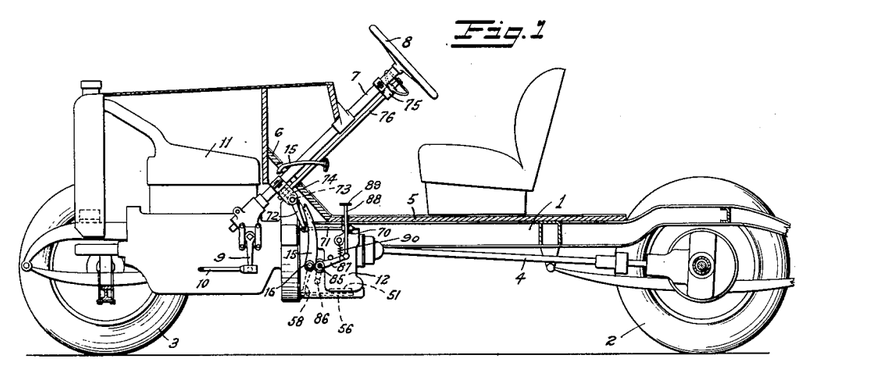
Fig. 1 diagrammatically illustrates an automobile in side elevation, partly in longitudinal vertical section for clearer disclosure.

The control lever 15 is connected to rock the shaft 16. To the shaft 16 is adjustably affixed an arm 17 engaging an annular groove 18 in the hub 19 of the clutch element 14, movement of the lever 15 in one direction effecting disengagement of the clutch elements 13 and 14; movement of the element 14 in the direction to engage the clutch element 13 being caused by the spring 20. The hub 19 is splined to the transmission mechanism driving shaft 21, rotation of the driving shaft 21 being thereby caused by rotation of the element 14, the hub 19 being slidable on the shaft 21 to permit disengagement of the clutch elements from each other. In the embodiment illustrated the shaft 16 is horizontal and extends through the lateral wall of the casing 12, the driver operable control arm 15 being connected to the shaft 16 outside the casing and extending up through the toe board 6, as indicated in Fig. 1, in convenient position for being actuated by the foot of the driver.

Within the casing 12 are located the several gears of the variable speed power transmission mechanism. In the embodiment illustrated the propeller shaft 4 is coupled to rotate with the driven shaft 22 journalled in a bearing in the rear wall of the casing 12, the shaft 22 extending across the interior of the casing and having a reduced inner end which bears in a bearing recess at the inner end of the driving shaft 21, as indicated at 23 (Fig. 2). Within the casing the shaft 22 supports one or more power transmitting members, which are shiftable to different positions. In the embodiment illustrated the shiftable power transmitting members are the spur pinions, or gears 24 and 25 (Fig. 2), and these gears are splined to the shaft 22 so as to be longitudinally shiftable thereon and so as to rotate the shaft 22 therewith.

Bearing in the front and rear walls of the casing 12 is the shaft, or jack-shaft 26. Rotatable on the shaft 26 is a bearing sleeve having the four spur gears 27, 28, 29 and 30, rotatable as one therewith. Rotatable with the driving shaft 21 is the spur gear 31, which is in constant mesh with the driven spur gear 27. The spur gear 31 is illustrated as wider than the spur gear 27, and the shiftable power transmitting gear 25 is recessed on the face adjacent the spur gear 31, and the peripheral wall of the recess of the gear 25 has a circular series of teeth which are adapted to engage the teeth of the spur gear 31 to lock these two gears to rotate as one, when the spur gear 25 is shifted to the right (Fig. 2) into overlapping relation with the gear 31. When in such overlapping relation it will be seen that rotation of the gear 31 from the clutch will simultaneously directly rotate the power transmitting gear 25 and consequent simultaneous rotation of the shaft 22 and the propeller shaft 4 will be effected at the speed of rotation of these interlocked gears, and in such relation "high speed" will be transmitted to the running wheels.

In respect to the transmission mechanism it will be understood that suitable gear ratios will be selected productive of "intermediate" speed and of "low" speed, and that an arrangement will be provided for effecting reverse rotation of the shaft 22 at relatively low speed. In the embodiment illustrated high speed is effected by the direct interlocking of the main driving gear 31 with the shiftable power transmitting gear 25, as already explained. The gear 25 is smaller in diameter than the gear 24 and may be shifted into engagement with the jack gear 28 to give intermediate speed, it being understood that the gear 28 is constantly driven through gear 27 whenever the gear 31 is driven. Similarly, the gears 29 and 30 are driven whenever the gear 31 is driven. By shifting the larger gear 24 into mesh with the gear 29 of relatively small diameter "low speed" is obtained. In order that reverse driving may be effected, an idler spur pinion 32 mounted on a stud shaft projecting from the casing may be employed. The pinion 32 is in constant mesh with the gear 30 and is so disposed that when the power transmitting gear 24 (Fig. 2) is shifted to the left, it will mesh with the spur pinion 32 and will be rotated in the opposite direction from that effected by the gear 29, reverse rotation of the propeller shaft 4 thus following, with consequent reverse rotation of the running wheels 2.

It will be understood that the power transmitting member, or gear 25, is shiftable either to power position, in which it is driven either from the gear 31 or the gear 28, or to neutral position intermediate the gears 31 and 28, in which latter position it may rotate idly. Similarly it will be understood that the power transmitting gear 24 may occupy intermediate or neutral position between the gear 29 and the pinion 32, or may be shifted to power position, wherein it is driven by either one or the other of the gears 29 and 32.

For the purpose of effecting the shifting of the power transmitting members, or gears, 24 and 25, each of these members has a hub as indicated by the numerals 33 and 34, respectively, having an annular groove 35, 36 for engagement with the shifting mechanism, as will hereinafter appear.

The mechanism for shifting the power transmitting members 24 and 25 includes two rock levers, and as the construction of these levers is the same, a description of one will suffice for each. Inwardly projecting from the opposite side walls of the casing 12 are the lower lever supporting lugs 37, above which are plates 38 supported by casing lugs 39, the plates 38 being removably fastened to the lugs 39. The numerals 40 indicate pivots or pivot pins having reduced extensions respectively entering bearing openings 41 and 42 in the lugs 37 and the plates 38. Journalled on the pivot pins 40 are the member shifting rock levers having upstanding sleeves or hubs 43 through which the pivot pins 40 pass, each of these levers having an arm 44 extending transversely of the jack shaft 26, each arm 44 having a headed pin 45 journalled in the end of the arm, the head of the pin being rectangular and disposed to interengage with the annular groove 35 or 36 in whichever of the power transmitting members 24 and 25 is to be shifted thereby.

At the lower ends of each of the hubs 43 are the arms 46 and 47, these arms being on the opposite side of the jack shaft 26 from the headed pins 45. The arms 46 and 47 are integral with the hubs 43 and incline downwardly from the lower ends of said hubs, the lower faces of the arms 46 and 47 being in the same horizontal plane and each of these arms having apertures or openings therethrough for the passage of certain elements of the position controlling mechanism, as the cylindrical dogs 48, these dogs being adjustable so as to protrude more or less from the openings in the arms, as will hereinafter appear.

Figure 3:
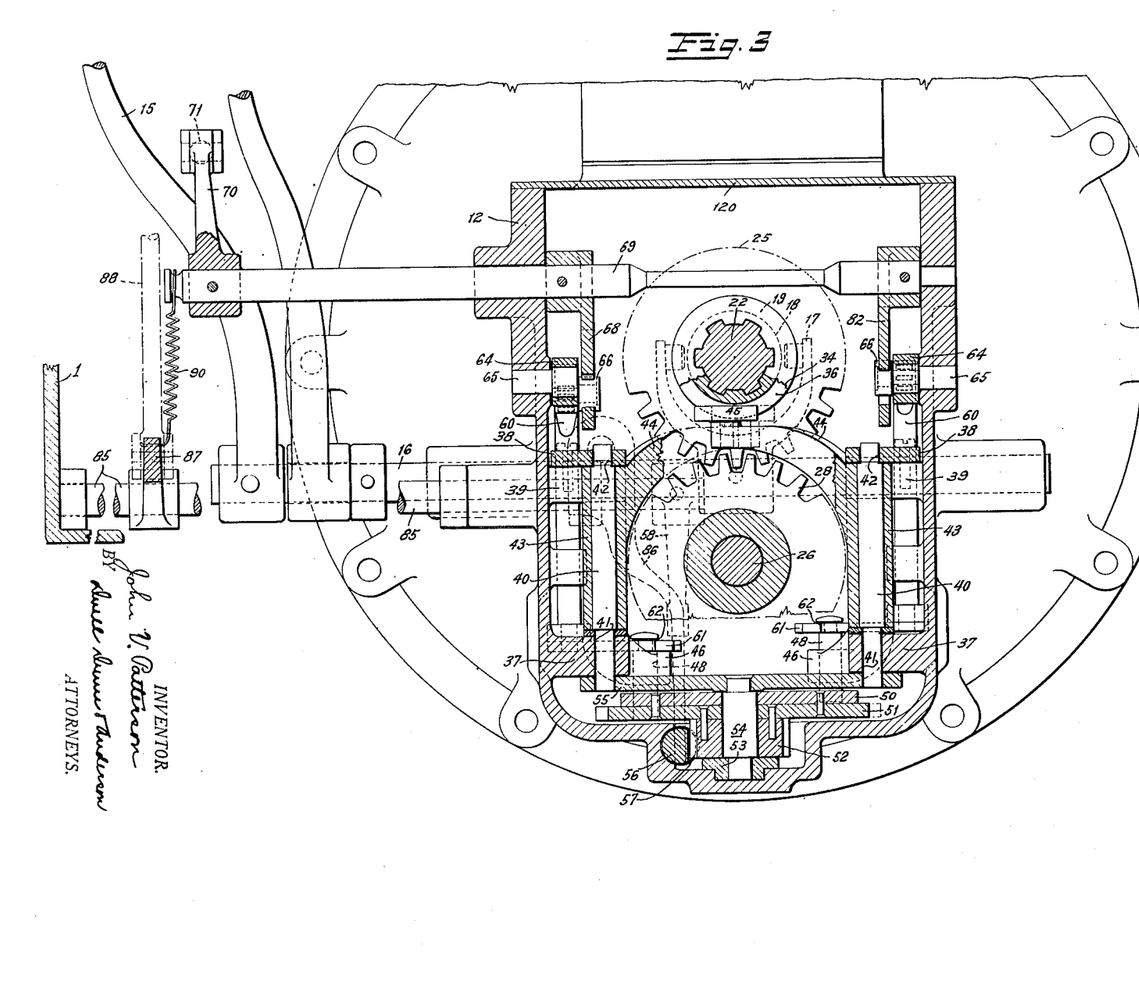
Fig. 3 illustrates the transmission in transverse vertical section, the selectors being in position selective of low speed.
Figures 4, 5:
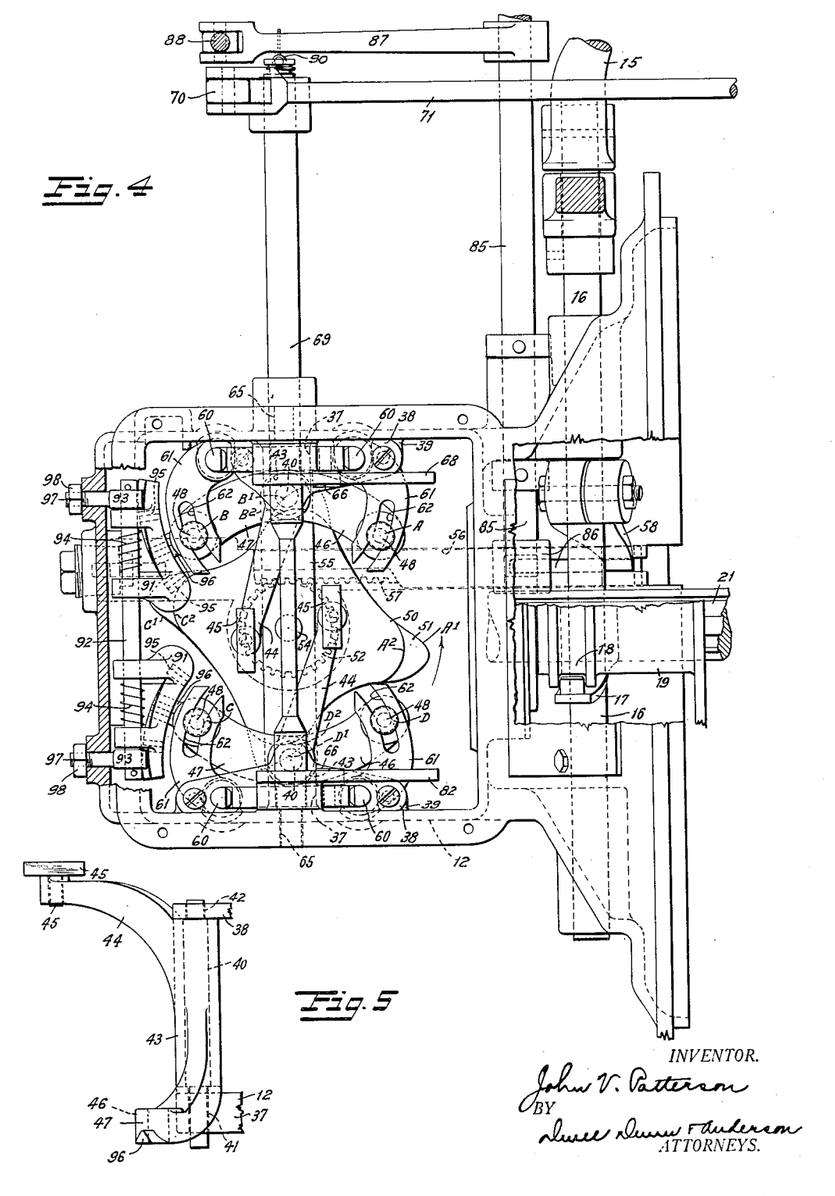
Fig. 4 is a plan view of the transmission, certain parts being broken away for clearer disclosure, the selectors being in position selective of "neutral"
Fig. 5 is a side elevation of one of the shifter rock levers.
Figure 6:
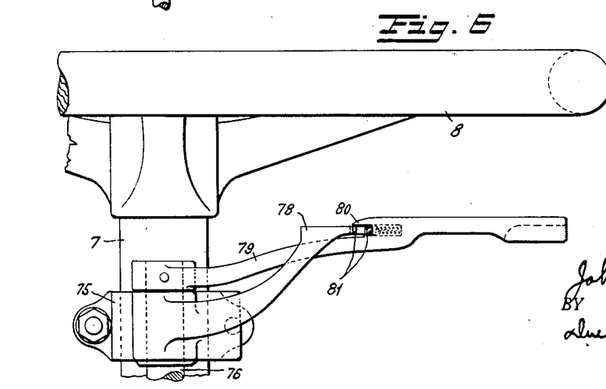
Fig. 6 is a side elevation of a portion of the steering column with an associated portion of the selector controlling device.
Figure 7:
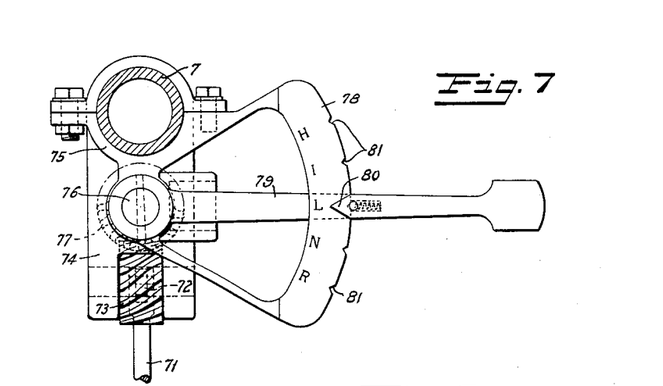
Fig. 7 is a cross section through the steering column showing a portion of the selector controlling device in plan.

The two rock levers having the arms 46 and 47 are horizontally spaced apart in the casing, as illustrated in Fig. 4. In a plane beneath these arms rotates a cam device or dog shifter which also is an element of the position controlling mechanism. One of the purposes of the cam device is to shift the rock levers in one or the other direction through the instrumentality of the dogs. In the present embodiment the cam device comprises two plates 50 and 51 (Fig. 3) pinned in fixed superposed relation to each other and having cam profiles, as will hereinafter appear. Pinned to the lowermost plate 51 is a pinion 52, rotative movement of the pinion being adapted to effect similar movement of the two plates 50 and 51. The numeral 53 indicates a bushing lying in a recess in the bottom of the casing and serving as a bearing for a pivot pin 54, the upper end of which is supported and braced in place by a cross piece or strap 55 through which the extensions of the pivots 40 pass. The pivot pin 54 serves as an axis on which the plates 50 and 51 are oscillated. Alongside the pinion 52 lies a longitudinally reciprocal rod 56 having rack teeth 57 for engaging the teeth of the pinion 52. The rod 56 extends toward the front end of the casing 12, where it is engaged by a shifter arm 58 depending from the shaft 16, and which is oscillated back and forth as the control lever 15 is oscillated. Thus it will be seen that reciprocal movement of the control lever 15 is adapted to effect oscillatory movement of the pinion 52 and similar movement of the dog shifting cam device.

The dogs 48 hereinbefore mentioned are adjustable transversely of the path of oscillation of the cam device and into and out of said path. In the present embodiment there are four dogs 48, and the mechanism for adjusting the dogs includes four similar, reciprocally shiftable control rack rods 60, one for each dog. Each rod 60 is guided in internal lugs of the casing, and has an arm 61 and a curved slot 62 in the arm 61 engages an annular groove in the upper end of the dog. Thus when the rod 60 is raised and lowered, the dog 48 connected thereto is positively raised and lowered therewith and supported thereby in adjusted position. The numeral 69 indicates a control shaft manually oscillatable at will, and the dogs 48 are adjusted by oscillatory movement of the shaft 69 by similar devices, as follows: To the shaft 69 are affixed the plates 68 and 82 having cam slots 67 and 83. Journalled on studs 65 interiorly projecting from the casing wall are the two control rock levers 64, one adjacent the plate 68 and the other adjacent plate 82. At each end of the levers 64 are gear teeth with which engage rack teeth at the upper ends of the rods 60, the gear teeth of one control lever 64 being engaged with the rack teeth of the two rods 60 supporting the two dogs for one of the gear shifting rock-levers, and the gear teeth of the other control lever 64 being engaged with rack teeth of the two rods 60 supporting the two dogs for the other gear shifting rock lever. The two control rock-levers 64 have cam followers or rollers 66, respectively, engaging the cam slots 67 and 83 in the plates 68 and 82.

The control shaft 69 extends from side to side of the casing and at a point outside the casing is provided with an arm 70 to which is connected one end of a link 71, the opposite end of the link being connected to a rock arm 72 (Fig. 1). The arm 72 is carried by a helical gear 73 journalled on a bracket 74 fastened to the steering column 7. Supported in the bracket 74 and in an additional bracket 75 carried by the steering column, is a rotatable control shaft 76 having a helical gear 77 cooperating with the helical gear 73, so that when the shaft 76 is turned in one direction or the other, the arm 72 and the shaft 69 rocks in one or the other direction. Mounted on the bracket 75 is a sector indicator plate 78. Fixed to the end of the shaft 76 is an operating control arm 79 having a pointer 80 adapted to spring into one or the other of the notches 81 in the sector plate 78, when the arm 79 is shifted. It will be seen that as the arm 79 is moved in one direction or the other the control shaft 69 is actuated to rock the cam plates 68 and 82 and thereby control the position of the cam slots 67 and 83 in these plates and in consequence the relative position of the dogs on the member-shifting rock levers. It will be observed that adjustment of the dogs on one member shifting rock-lever is effected through one cam plate 68 and that the set of two dogs of the other member shifting rock lever is adjusted by the other cam plate 82, the two cam slots 67 and 83 cooperating to regulate the relative position of the four dogs to each other, as will more particularly hereinafter appear.

The numeral 85 indicates a control rock shaft extending into the casing 12 and having an arm 86, the end of which latter is adapted to contact the arm 58 of the main pedal control lever 15, so as to urge the arm 58 in a direction opposite to that effected by depression of the lever 15 by the foot of the driver, and in the same direction as the arm 58 is moved by the spring 20. Outside the casing 12 the shaft 85 is provided with an arm 87 (Fig. 2) to which is pivoted a treadle arm 88 extending up through the floor boards and having a head 89 in convenient position for being actuated by the foot of the driver of the automobile. At 90 is a spring mounted for urging the arm 86 in a direction opposite to that effected by depression of the treadle 88, this spring tending to raise and hold the treadle 88 in raised position.

On the inside and near the bottom of the casing 12 devices are provided for checking the shift movement of the rock-levers having the arms 46 and 47, and guarding against overshift of the power transmitting gears 24 and 25. The numerals 91 indicate check shoes, each pivoted on a rod 92 supported in bearings 93, the check shoes 91 being urged downwardly by springs 94, there being a separate spring for each shoe, one shoe being adapted to cooperate with one of the rock levers and the other with the other rock lever. Each shoe has three V-shaped notches 95 in its lower face, and each arm 47 has a counterpart V-shaped lug 96 adapted to engage one or the other of the notches 95 of the check shoes, so as to be yieldingly restrained from movement, it being understood that the shoes 91 will yield upwardly when sufficient force is applied to rotate the member shifting levers. The bearings 93 are at the ends of threaded pins 97, extending through the wall of casing 12 and secured in place by nuts 98.

From the foregoing it will be observed that when the driver is seated (Fig. 1) the lever 15 and the treadle 88 are in convenient position to be depressed by the foot. When the shift-controlling element 15 is depressed, the arm 58 (Fig. 2) moves in clockwise direction and, through the rack 56 and pinion 52 rotates the dog shifter 50—51 in counter-clockwise direction (Fig. 4). Thereupon, by the driver depressing the other shift controlling element 88, the arm 86 thereof will contact the rear of the arm 58 and shift the rack rod 56 in the opposite direction and thus rotate the dog shifter in a clockwise direction. It will therefore be seen that the dog shifter is under the control of two shift controlling elements 15 and 88, each of which is driver actuatable to rotate it, one to rotate it in one direction and the other to rotate it in the opposite, or reverse direction. And it will also be seen that the rotation of the dog shifter in each of forward and reverse directions can be effected by application of power by the driver. In the embodiment illustrated the spring 20 is adapted to assist in reversely rotating the dog shifter and may be made sufficiently strong to cause said reverse rotation. But the forward and reverse movements may be accomplished in case the spring be not used, or should break or be removed. At this point it may be stated that when the dogs 48 are in certain positions relative to the dog shifter, rotation of the dog shifter causes it to wipe against one of the dogs and to shift such dog and thereby rock the member shifting lever 46—47 to effect shift of one of the power transmitting gears. Should this shift action be effected by the spring 20, the treadle 88 may be driver actuated to complete the shift, as for instance, should resistance be encountered which the spring 20 might be insufficient to overcome, or should clutching be completed and further shift be required to effect full meshing in the new power position of the gears. Thus the shift action of the treadle 88 may supplement that of the lever 15, besides causing counter action of the dog shifter separately from that caused by said lever. In the specific embodiment illustrated, as the foot lever 15 is depressed to shift the dog shifter cams, the driving clutch connection between the engine and the transmission driving gear 31 is simultaneously released, the driving connection being reestablished on opposite movement of the foot lever.

Shift of the power transmitting gears 24 and 25 to power positions or to neutral positions is effected by cooperative action between the dog shifter and one of the other of the dogs 48, the relation between said dogs and the dog shifter being adjustable for selecting between an action of the shift mechanism which will shift the power transmitting member and an action of non-shift of the power-transmitting member, the shift mechanism also being adjustable for selecting between shift of the power transmitting member by forward movement of the shifting mechanism and by reverse movement thereof. It has already been noted that the shifting mechanism, whether actuated in forward or reverse direction, is adapted to shift the power transmitting member from either of its positions to any other thereof.

For purpose of explanation, the dogs 48 are distinguished by the reference characters A, B, C, D. For each dog there is provided a set of simultaneously movable dog shifting cams or wipers in superposed relation to each other, all the sets being movable as one. In the embodiment illustrated the dog shifter is a disk or wheel composed of the plates 50 and 51 and having a plurality of teeth generally radially projecting from the axis 54, on which the wheel has pivotal movement, the edges of the plates being shaped to provide the cam profiles as indicated in Fig. 4, wherein the cams for cooperating with dog A are indicated at $A^1$ $A^2$; those for dog B at $B^1$ $B^2$; those for dog C at $C^1$ $C^2$ and those for dog D at $D^1$ $D^2$. The radial dimension of the teeth $A^1$, $B^1$, $C^1$, $D^1$, is longer than that of teeth $A^2$, $B^2$, $C^2$, $D^2$, so that the throw of the former is greater than the throw of the latter. The radial dimension of the teeth $A^2$, $B^2$, $C^2$, $D^2$, is the same for each tooth, the outer extremities of these teeth being each at the same distance from the axis 54. Also the outer extremities of the teeth $A^1$, $B^1$, $C^1$, $D^1$, are equidistant from the axis 54. The teeth have a wiping action in contact with the dogs, and are given cam profiles in order to facilitate ease of cooperative wiping action on the dogs. As the dog shifter is adapted to effect shift whether shifted in forward or reverse direction, the teeth have cam profiles facing in each of opposite rotative directions, so as to give ease of cooperative wiping action in either direction of rotative movement.

Figure 9:
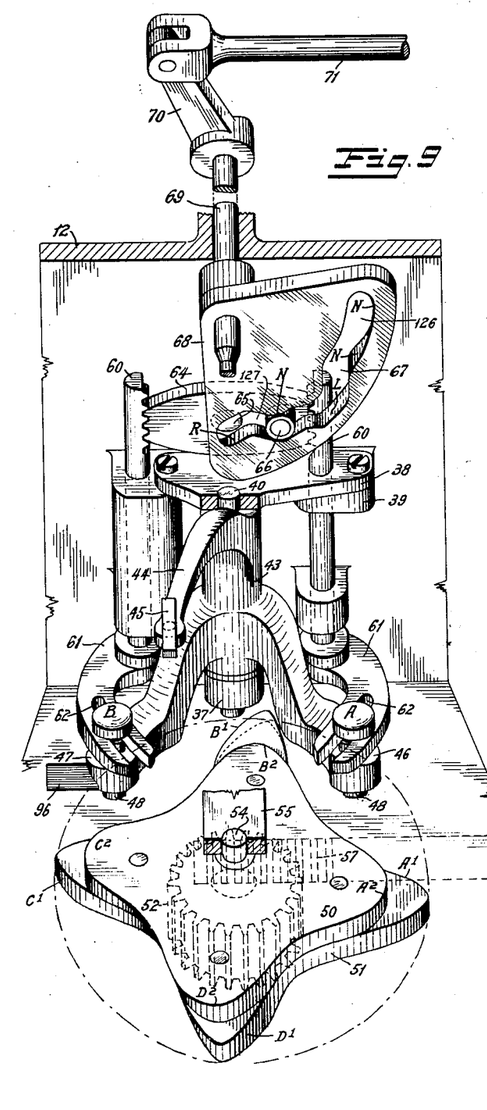
Fig. 9 is a perspective view of a portion of the shifting mechanism.

In Fig. 4, and Fig. 9, the dogs are each in position corresponding to "neutral" of the shiftable gears 24 and 25, and in this position the peak of the neutral cams $A^2$, $B^2$, $C^2$, $D^2$, are adapted to move past the sides of the dogs without shifting the dogs. Also in this position the lower ends of the dogs are above the path of the power cams $A^1$, $B^1$, $C^1$, $D^1$, so as not to be shifted by the latter. The dogs will have been set in the neutral position referred to by actuation of the control plates 68 and 82, the profiles of the cam slots 67 and 83 adjusting the dogs to neutral or retaining certain of the dogs in neutral if previously adjusted to such position. The profiles of the cam slots 67 and 83 are such, and these profiles are so related to each other that when shift of either of the gears 24 or 25 to power position is to follow actuation of the shift mechanism, one of the dogs, as for instance is adjusted by manual actuation of its control cam slot into the path of the wiper $B^1$ which effects shift to "reverse", by being caused to protrude sufficiently from the lever arm 47, to be wiped by the wiper $B^1$, as the latter is rotated (see Fig. 2). Simultaneously with this adjustment of dog B to reverse selective position the dog A for the same shiftable gear will be drawn up by its control rod 60 out of the path of each of the wipers $A^1$ and $A^2$, and the dogs C and D will remain neutral. When then the dog shifter is rotated, as for instance by pedal lever 15, the wiper $B^1$ will shift dog B to one side with resultant shift of the shiftable gear to power position of "reverse." The other dog A carried by the same member-shifting lever as dog B, in consequence of shift of said member-shifting lever, will be rotatively shifted or carried by its arm 46 toward position for being actuated by the dog shifter wipers $A^1$ or $A^2$, but as it has been elevated to position above each of these wipers $A^1$ or $A^2$, these latter will then freely pass therebeneath. It will be noted, however, that whereas in neutral position dog A was to one side of the path of wiper $A^2$, so as to escape the same, rotation of arm 46 has moved dog A toward the path of the wipers so that it may be adjusted into the path of wiper $A^2$ by subsequent adjustment by its selector control cam. Thus it will be seen that the rotative movement of dog A induced by directly shifting dog B partially adjusts dog A into coactive relation to its wiper cam $A^2$. Similarly if shift to power position by dog A be selected to follow actuation of the shift mechanism, the dog A will be adjusted so as to protrude from lever arm 46 into the path of wiper or cam A¹, and the dog B will be elevated by its selector cam slot 67 so as to escape wipers B¹ and B², but will be rotatively shifted by rock arm 46 and thereby partially adjusted to select for a different shifted position of the same shiftable gear. The foregoing operations apply equally if shift to power position by either dogs C or D be selected. Adjustment selective of shift of either shiftable gear to either of its power positions is simultaneously selective of neutral position for the other shiftable gear, the profiles of the cam slots 67 and 83 assuring positions of the dogs relative to each other selective of such result.

In the embodiment illustrated it will be seen that each member-shifting rock lever has two member-shifting or position-controlling dogs 48 constantly interengaging said lever to shift therewith. Referring, for instance, to the dogs A and B, the rock lever engaged thereby is shifted in one direction through one dog and in the opposite direction through the other dog. The wiper or cam, A² or B², shifts the rock lever to an extent which places the shiftable gear in "neutral", whereas the wiper A¹ or B¹ is adapted to shift the shiftable gear to a different and greater extent, and these wipers A¹ or B¹ will shift the shiftable gear directly from one power position to the other power position, the shift being through "neutral", and effective in either direction. All that is required is to adjust the relation between the dogs and the wipers, as previously explained. And it will be noted that the relation between the dogs and the dog shifter or wipers is adjustable for selecting shift at will, and that the adjustment is independent of the relation of either controlling element, whether the pedal lever 15 or the treadle 88.

In the embodiment illustrated the dog-shifter is oscillatable on the axis 54 which is parallel to the axes 40 of the two rock levers. The axis 54 is between the two axes 40, and each of the latter is beside the propeller shaft 22 and the jack shaft 26 and extends transversely to said two shafts. In this wise a compact arrangement is provided adapted to be located in the gear casing, which latter may largely be cast integral and have a removable cap 120 (Fig. 2) for access and through which assembly of the transmission gear may be made. The axis around which the dogs A and B or C and D shift is eccentric to the axis of the dog shifter so that shift of one is in a path normally adapted to intercept that of the other and, in the present embodiment and in relation to the power for effecting shifting, the dog-shifter, wiper or cams, becomes a driving shifter part, each of the dogs being a driven shifter part.

When the automobile is at rest, the shiftable power transmitting gears 24 and 25 may be in their neutral positions, out of mesh with the gears of the jack shaft and with the transmission driving gear 31. The rock lever arms 46 and 47 will be in the positions illustrated in Fig. 4, and the dogs 48 will be disposed adjacent the path of rotation of the dog shifter, or cams, the dogs A and B being adjacent the opposite side of the cams from the dogs C and D. If now it be desired to shift to "low", the driver shifts the selector controller handle 79 to the notch 81 corresponding to low. Shifting of the handle 79 rotates shaft 76, which latter moves arm 72, link 71, arm 70, causing rotary movement of shaft 69 and the two control plates 68 and 82. The cam slot in the control plate 68 which moves the control dogs A and B will adjust dog A downwardly into the path of cam A¹, and simultaneously the dog B will be adjusted upwardly out of the path of cams B¹ and B². The dogs C and D will remain in their neutral selective positions, the slot in control plate 82 being concentric to shaft 69, for the amount of movement required during said adjustment of dogs A and B, as indicated at 125, Fig. 8. By then rotating the dog shifter by depressing pedal lever 15, the cam A¹ will be moved into contact with the side of dog A and will shift or wipe the dog A to one side causing the interengaged rock lever to be rocked in a direction to shift gear 24 to the right (Fig. 2) into mesh with jack gear 29. Thereupon driving transmission will be through gears 31, 27, 29 and 24, corresponding to low speed. If reverse driving of the automobile, instead of "low", direct, or forward driving had been desired, the control handle 79 would have been shifted to the notch 81 corresponding to reverse. The result would have been similar to that of shift to "low" except that for reverse, the dog A would be lifted out of the paths of cams A¹ and B¹ and the dog B would be adjusted downwardly into the path of cam B¹; and the gear 24 would be shifted to the left (Fig. 2) into mesh with the pinion 32, driven from pinion, or gear 30, of the jack shaft. If "high" or "intermediate" had been selected, shift of the control handle 79 to the notch 81, indicating the desired speed would adjust the dogs C or D, one into the path of cam C¹ and the other out of the path of cams D¹ and D², or vice versa, the adjustment of dogs C or D being effected by the cam slot in control plate 82, the cam slot in plate 68 having a generally concentric portion 126, holding dogs A and B at neutral selective position during said adjustment of dogs C or D.

The profiles of the cam slots 67 and 83 are such and are so related to each other that adjustment of either control dog 47 to position selective of shift of one of the gears 24 or 25 to power position, either compels selection of shift of the other gear to neutral position or retention of the latter gear in neutral position. In the present embodiment the plates 68 and 82 are parallel, one end of each cam slot therein being substantially concentric to the shaft 69. The concentric portions 125 and 126 of the two cam slots are at opposite ends of the respective slots, the power position selecting cam profile 127 of slot 67 being also at an opposite point from the power position selecting portion 128 of slot 83. It will be seen, therefore, that either of the dogs 48 may be adjusted to power selective position, and that when one dog for one gear is so adjusted, the dogs for the other gear will either be adjusted to neutral selective position or will be retained in neutral selective position.

It is observed that the control rods 60, and the dogs 48 to be adjusted thereby, are coupled for simultaneous shift adjustment, some in opposite directions from others, and that the dogs 48 are held in relative adjusted position by the rods 60 which, in turn, are held in relative position to each other by the operating connections leading to the control handle 79. Thus there is assurance of adjustment of the dogs and of their being supported and held in correct adjusted position relative to each other, and to the dog shifter, or cams. In the present embodiment the curved slots 62 in the arms 61 of the control rods 60 permit rotary shift movement of the dogs 48 without rotary movement of the arms 61, and permit adjustment of the dogs in any position of the rock levers with which they interengage. The rods 60 are preferably stiff, and their location alongside the jack shaft and the shaft 22, so as to be adjustably movable transversely to these shafts is productive of compactness and strength in the construction.

In the construction illustrated the dog shifter includes four sets of superposed wipers, or cams, A¹ A², B¹ B², C¹ C² and D¹ D², each set at a different point circumferentially of the axis of rotation 54, one cam of each set being of greater throw than the other. Each shiftable power transmitting gear 24 or 25 may be shifted by either of its two dogs, and it will be noted that the relation of these two dogs to each other is such that the power transmitting gear is shifted in one direction through one dog and in the opposite direction through the other dog, one dog being shifted in clockwise direction and the other in counter-clockwise direction by a movement of the cams in the same direction. And it will be noted that this shifting of the dogs may be effected by the cams whether the cams be moved in a forward direction or in a reverse direction. In usual practice the cams move through a short distance before coming into contact with the dog through which shift is to be effected, this distance affording opportunity for release of the clutch prior to starting shift of the gear. Continued shift of the cam causes it to wipe against the dog and shift the latter and thereafter, while moving in the same direction, to shift out of contact with the dog. In this way the cam first thrusts the dog to effect the shift and the cam thereafter moves out of contact with the dog with consequent relief of thrust strain, and before return movement of the cam. Thus whether the thrust be effected by movement of the cam in either direction, the thrust strain is relieved before return movement in either direction. In consequence the pedal 15, and the treadle 88 are freed of continued strain with consequent advantage of manipulation for shifting purposes. Also the dogs are relieved of strain and freed for immediate adjustable movement.

In the embodiment illustrated each dog 48 is selectively adjustable to three positions. In one position the dogs clear the cams, so that the cams move freely past the dogs. In another position the dogs protrude from the rock lever sufficiently to lie in the path of the cams A², B², C² and D², respectively, but out of the path of the cams A¹, B¹, C¹, and D¹. When a dog in this latter position is wiped by the cam, the gear is shifted to neutral position. In a third position the dog protrudes still further from the rock lever and into the path of the greater throw cams A¹ B¹ C¹ and D¹, whereupon shift of the gear to power position is effected when the dog is wiped by the cam.

It will be noted that the flexibility of operation of the shifting mechanism is such as to meet all practical conditions of travel and all necessities of the driver. For instance, the pedal 15 may be depressed and the clutch released before any shifting of gears begins. Either before depressing the pedal 15, or after starting depression, but before starting shift, the control handle may be set to select the speed desired. Full depression of pedal 15 will cause shift to the selected speed. When set for any speed any other speed or neutral may be selected. Having shifted by depression of pedal 15, another speed may be selected before rise of pedal 15, and the treadle 88 employed to effect the shift by moving the cams in the opposite direction from that effected by depression of pedal 15. Or if the spring 20 is used, the spring will rotate the cam in said opposite direction. Should the spring be insufficient to complete the shift, the treadle 88 may be employed to complete the return shift movement. It will therefore be seen that at the end of either forward or reverse movement of the shifting mechanism, the driver may select between an action of the shifting mechanism which does not effect shift of the shiftable gear and an action of the shifting mechanism which will effect shift of the shiftable gear. The driver may select to change from one power position directly to another power position, the mechanism assuring always that the shifted gear will pass through neutral before reaching a different power position.

By adjusting the dog 48 from the control handle 79 action of the shifting mechanism may be caused either to effect shift of one or the other of the gears 24 and 25, or not to effect shift of either of said gears, and when the dogs are adjusted in positions selective of shift of one of said gears they are also in positions selective of counter position for the other gear. The selecting mechanism is adapted to be adjusted for selecting the desired shift quite independent of actuation of the controlling lever 15, so that selection for a new speed may readily be made while either of the gears 24 and 25 are in either of their positions, whether power position or neutral position. And the selecting mechanism is operable preliminarily to either forward or reverse movement of the shifting mechanism, for selecting the position of the power transmitting gear to follow next actuation of the shifting mechanism. Compactness of structure and efficient accommodation of parts are promoted by extending the arms 44 of the member shifting levers between the shafts 22 and 26, and locating the cross-arm formed by the arms 46 and 47 closely adjacent one side of the path of the dog shifter, as illustrated.

Figure 10:
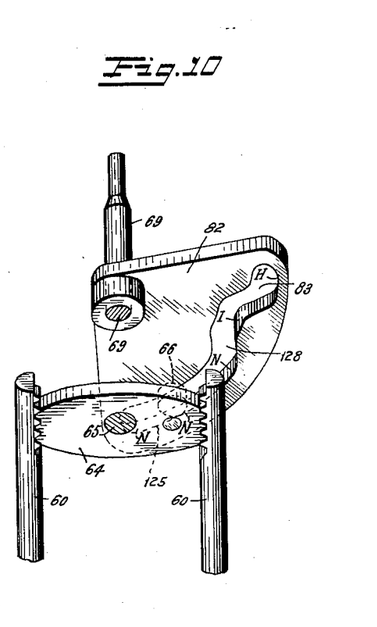
Fig. 10 is a detail.

In operating an automobile shifting mechanism of the character described it is not only desirable to be able to adjust the selecting mechanism for shifting from one position to any other position, but it is most convenient to arrange for selecting to shift to "low," "intermediate" and "high" in the order named and by shift of the controlling handle 79 in one direction. Accordingly in the present embodiment, the cam slots 67 and 83 are relatively arranged and constructed to effect shift in the order just named, and also to throw all the shiftable gears to neutral simultaneously, not only to permit idle running of the engine but also preliminary to selecting for reverse shift position. Referring to Figs. 9 and 10, which illustrate the mechanism in the position selective of neutral, the left-hand end of the cam slot 67 is selective of the position of the dogs A and B corresponding to reverse operation and is marked R. From R the slot inclines to N, where the cam is of greater radius and corresponds to neutral position of the dogs A and B. Further incline of the cam slot to L, a point of still greater radius, will position the dogs A and B selective of "low." The cam slot then inclines to a radius corresponding to "neutral" and for the remainder of the slot is "neutral" and concentric with the axis of rotation of the cam, as indicated at 126. Similarly, in respect to the cam slot 83, more clearly shown in Fig. 10, which corresponds in position to Fig. 9. The cam roller 66 in Fig. 10 is at neutral position, and as the roller 66 of slot 67 Fig. 9, is also at neutral, all of the dogs will be in relative position selective of neutral for each of the power transmitting gears 24 and 25. When the cam slot is adjusted counter-clockwise from the position illustrated in Fig. 10, the engaging cam roll will remain at neutral, whereas the cam roll in slot 67 will shift the dogs to position selective of reverse. When the cams are rotated clockwise from the positions illustrated in Figs. 9 and 10, the dogs A and B will be shifted to their positions corresponding to "low," but the dogs C and D will not be shifted at this time owing to the cam slot 83 being concentric and corresponding to neutral selections. Further rotation of the cams clockwise will cause shift of the dogs A and B to neutral, where they will remain while the dogs C and D are being shifted to "intermediate" or to "high." It will therefore be seen that the selecting mechanism may be shifted from "reverse" to "neutral" and from "neutral" to "low," "intermediate," and "high" in the order named, the shift being effected by movement of the cams in one direction. Reverse movement of the control cams will cause selection in reverse order to that named.

Thus by the above described construction are accomplished the objects hereinbefore referred to.

Since certain changes may be made in the above construction, and different embodiments of the invention could be made without departure from the scope thereof, it is intended that all matter contained in the above description or shown in the accompanying drawing shall be interpreted as illustrated and not in a limiting sense.

Having described my invention, what I claim as new and desire to secure by Letters Patent is:

1. In an apparatus of the character described, in combination, variable speed power transmission mechanism including a power transmitting member shiftable to different positions, member shifting mechanism having a driven shifter part and a driving shifter part movable into and out of contact with each other and having forward and reverse movements and means whereby said shifting mechanism is controllable, in either direction of movement of said parts to thrust said driven part to effect shift of said member.

2. In an apparatus of the character described, in combination, variable speed power transmission mechanism including a power transmitting member shiftable to different positions, member shifting mechanism having a driven shifter part, and a driving shifter part having forward and reverse rotative movements into and out of contact with each other, and means whereby said shifting mechanism is controllable in either direction of movement of said parts to thrust said driven part to effect shift of said member and, on movement in either direction, to relieve the thrust strain after effecting shift of said member.

3. In an apparatus of the character described, in combination, variable speed power transmission mechanism including a power transmitting member shiftable to different positions, member shifting mechanism including a driven shifter part, and a driving shifter part each having forward and reverse rotative movements and means whereby said shifting mechanism is controllable in either direction of movement of said parts to thrust said driven part to effect shift of said member and, on movement in either direction to relieve the thrust strain after effecting shift of said member and before return movement of said driving member.

4. In an apparatus of the character described, in combination, variable speed power transmission mechanism including a power transmitting member shiftable to different positions, member shifting mechanism including a reciprocally shiftable driven shifter part and a reciprocally shiftable driving shifter part, and means whereby movement of said driving part in either direction is adapted to cause it to contact and shift said driven part and thereafter move out of contact with said driven part, and connections whereby shift of said driven part is adapted to cause shift of said member.

5. In an apparatus of the character described, in combination, variable speed power transmission mechanism including a power transmitting member shiftable to different positions, member shifting mechanism including a driven shifter part and a driving shifter part, said driving part having forward and reverse movements, means whereby movement of said driving part in either direction is adapted to cause it to contact and shift said driven part and thereafter move out of contact with said driven part, and connections whereby shift of said driven part is adapted to cause shift of said member.

6. In an apparatus of the character described, in combination, variable speed power transmission mechanism including a power transmitting member shiftable to different positions, member shifting mechanism, position controlling mechanism adjustable for selecting between an action of non-shift of said member on actuation of said shifting mechanism and an action shifting said member to any selected position, said shift mechanism including a rock lever with which said member shifts having position controlling dogs interengaging said lever to shift therewith and sets of simultaneously rotatable relatively superposed dog shifting cams, one set for each dog, said dogs adjustably movable into and out of the paths of the cams of said sets, respectively.

7. In an apparatus of the character described, in combination, variable speed power transmission mechanism including a power transmitting member shiftable to different positions, member shifting mechanism, position controlling mechanism adjustable for selecting between an action of non-shift of said member on actuation of said shifting mechanism and an action shifting said member to any selected position, said shift mechanism including a rock lever with which said member shifts having position controlling dogs interengaging said lever to shift therewith, and a rotatable dog shifter, said dogs adjustably movable into and out of the path of said shifter, and two manually operable control levers, one adapted to rotate said dog shifter in one direction and the other to rotate said dog shifter in the opposite direction.

8. In an apparatus of the character described, in combination, variable speed power transmission mechanism including a power transmitting member shiftable to different positions, member shifting mechanism, position controlling mechanism adjustable for selecting between an action of non-shift of said member on actuation of said shifting mechanism and an action shifting said member to any selected position, said shift mechanism including a rock lever with which said member shifts having position controlling dogs interengaging said lever to shift therewith. and a rotatable dog shifter, said dogs adjustably movable into and out of the path of said shifter, and two manually operable control levers, one adapted to rotate said dog shifter in one direction and the other to rotate said dog shifter in the opposite direction, driving mechanism for said transmission mechanism, and means actuated by one of said control levers adapted to release and establish driving relation between said driving mechanism and said transmission mechanism as said last mentioned control lever is shifted.

9. In an apparatus of the character described, in combination, variable speed power transmission mechanism including a power transmitting member shiftable to different positions, member shifting mechanism, position controlling mechanism adjustable for selecting between an action of non-shift of said member on actuation of said shifting mechanism and an action shifting said member to any selected position, said shift mechanism including a rock lever with which said member shifts having position controlling dogs interengaging said lever to shift therewith and a rotatable dog shifter, said dogs being adjustable relative to each other, different extents of rocking of said lever in one or the other direction being dependent on the adjustment of one or the other of said dogs relative to said dog shifter.

10. In an apparatus of the character described, in combination, variable speed power transmission mechanism including a power transmitting member shiftable to different positions, member shifting mechanism, position controlling mechanism adjustable for selecting between an action of non-shift of said member on actuation of said shifting mechanism and an action shifting said member to any selected position, said shift mechanism including a rock lever with which said member shifts having position controlling dogs interengaging said lever to shift therewith and a rotatable dog shifter, said dogs adjustably movable into and out of the path of said shifter, reciprocally shiftable rods connected for adjustably moving said dogs respectively, means coupling said rods for being simultaneously shifted in opposite directions and means adapted to retain said rods in relative adjusted position.

11. In an apparatus of the character described, in combination, variable speed power transmission mechanism including a power transmitting member shiftable to different positions, member shifting mechanism, position controlling mechanism adjustable for selecting between an action of non-shift of said member on actuation of said shifting mechanism and an action shifting said member to any selected position, said shift mechanism including a rock lever with which said member shifts having position controlling dogs interengaging said lever to shift therewith and a rotatable dog shifter, said dogs adjustably movable into and out of the path of said shifter, reciprocally shiftable rods connected for adjustably moving said dogs respectively, means coupling said rods for being simultaneously shifted in opposite directions and means adapted to retain said rods in relative adjusted position, said rods having slots in which said dogs shift under action of said dog shifter.

12. In an apparatus of the character described, in combination, variable speed power transmission mechanism including a power transmitting member shiftable to different positions, member shifting mechanism, position controlling mechanism adjustable for selecting between an action of non-shift of said member on actuation of said shifting mechanism and an action shifting said member to any selected position, said shift mechanism including a rock lever with which said member shifts having position controlling dogs interengaging said lever to shift therewith and a rotatable dog shifter, said dogs adjustably movable into and out of the path of said shifter, reciprocally shiftable rack rods for adjustably moving said dogs respectively, a rock member having teeth engaging the teeth of said rack adapted to shift said rods in opposite directions, and means adapted manually to rock said rock member to adjust said dogs and retain them in adjusted position.

13. A shift mechanism for the shiftable power transmitting member of a variable speed power transmission mechanism including, in combination, a rock lever with which said member shifts, adjustable position selector dogs interengaging said rock lever to rock therewith, a cam device rotatable at will to contact a dog in shift selecting position to effect shift of said member, and means for adjusting said dogs in each shift position of said lever and independently of movement of said lever.

14. A shift mechanism for the shiftable power transmitting member of a variable speed power transmission mechanism including, in combination, a rock lever with which said member shifts, adjustable position selector dogs interengaging said rock lever to rock therewith, and a cam device manually rotatable to contact a dog in shift selecting position to effect shift of said member and thereafter move in the same direction out of contact with said last mentioned dog.

15. A shift mechanism for the shiftable power transmitting member of a variable speed power transmission mechanism including, in combination, a rock lever with which said member shifts, adjustable position selector dogs interengaging said rock lever to rock therewith and a manually rotatable wheel having dog wipers adapted to contact a dog in shift selecting position, said dogs being selectively adjustable into or out of position to be contacted by said wipers respectively as said wheel is rotated in either direction.

16. In an apparatus of the character described, in combination, variable speed power transmission mechanism including a power transmitting member shiftable to different positions, means adapted to shift said member, said means including a rotatively reciprocally movable member having a series of generally radially projecting cam teeth, the profiles of each of which face in each of opposite rotative directions, the teeth of one cam being longer than the other, a gear with which said member is fixed to rotate, a reciprocally movable rack engaging said gear, a manually operable lever connected for shifting said rack in one direction, a transmission casing having a bottom recess in which said gear rotates, and a wall channel in which said rack rod reciprocates.

17. In an apparatus of the character described, in combination, variable speed power transmission mechanism and position controlling mechanism for the shiftable member of said transmission mechanism, said position controlling mechanism including two control-dogs adjustable relative to each other, and a control rock-lever by which said dogs are simultaneously moved into different adjusted relations to each other, a cam follower on said control rock-lever, and a manually rockable plate having a cam slot engaged by said follower.

18. In an apparatus of the character described, in combination, variable speed power transmission mechanism and position controlling mechanism for the shiftable member of said transmission mechanism, said position controlling mechanism including two control-dogs adjustable relative to each other, a rock lever having opposite gear teeth, racks engaging said teeth and connected to adjustably move said dogs, and a manually rockable cam for rocking said lever.

19. In an apparatus of the character described, in combination, variable speed power transmission mechanism and position controlling mechanism for the shiftable member of said transmission mechanism, said position controlling mechanism including a member shifting rock-lever, two control-dogs interengaging said lever to rock therewith, a control lever rockable in a plane transverse to that of shift of said member shifting lever, means adapted manually to rock said control rock-lever to different positions, and rods connecting opposite arms of said control rock-lever with said dogs, respectively, for causing said dogs to extend in different adjusted positions beyond said member shifting lever, the connection between said dogs and rods permitting shifting of said member shifting lever in any adjusted position of said control rock lever.

20. In an apparatus of the character described, in combination, variable speed power transmission mechanism including a propeller shaft having a pinion rotatable therewith, a jack shaft having a gear, a rock lever pivoted beside said shafts on an axis extending transversely to said shafts, two sets of relatively superposed cams rotatively oscillatable on an axis parallel to the axis of said rock lever, the throw of one cam of each set being greater than that of the other, said lever having an arm extending transversely of said shafts coupled for shifting said pinion into and out of mesh with said gear as said lever rocks, a cross-arm on said lever adjacent and at one side of the path of said cams, and member-shifting dogs rockable with said cross-arm and adjustable into different selective positions relative to said cams.

21. In an apparatus of the character described, in combination, variable speed power transmission mechanism including a propeller shaft having a pinion rotatable therewith, a jack shaft having a gear, a rock lever pivoted beside said shafts on an axis extending transversely to said shafts, two sets of relatively superposed cams rotatively oscillatable on an axis parallel to the axis of said rock lever, the throw of one cam of each set being greater than that of the other, said lever having an arm extending between said shafts coupled for shifting said pinion into and out of mesh with said gear as said lever rocks, a cross-arm on said lever adjacent and at one side of the path of said cams and on the opposite side of said jack shaft from said pinion coupled arm, two member shifting dogs rockable with said cross-arm and adjustable transversely of the path of said cross-arm into different selective positions relative to said cams.

22. In an apparatus of the character described, in combination, variable speed power transmission mechanism including a propeller shaft having a pinion rotatable therewith, a jack shaft having a gear, a rock lever pivoted beside said shafts on an axis extending transversely to said shafts, two sets of relatively superposed cams rotatively oscillatable on an axis parallel to the axis of said rock lever, the throw of one cam of each set being greater than that of the other, said lever having an arm extending transversely of said shafts coupled for shifting said pinion into and out of mesh with said gear as said lever rocks, a cross-arm on said lever adjacent and at one side of the path of said cam, member shifting dogs interengaging apertures in said cross-arm, respectively, control rods supporting said dogs, respectively, and reciprocally adjustable lengthwise transversely of said shafts, and a rock lever to which said control rods are operatively connected for being simultaneously adjusted in opposite directions, so as to adjust said dogs into and out of position to be engaged and shifted by said cams.

23. In an apparatus of the character described, in combination, variable speed power transmission mechanism including a propeller shaft having two power transmitting members rotatable therewith, a jack shaft having gears, two rock levers, each pivoted beside said shafts on an axis extending transversely to said shafts, a cam wheel oscillatable on an axis parallel to and between the axes of said levers, said wheel having four circumferentially related sets of two superposed cams, the throw of one cam of each set being greater than that of the other, each of said levers having an arm extending between said shafts coupled for shifting said power transmitting members, respectively, to cause driving or non-driving of said propeller shaft, and two lever rocking position selector dogs for each rock lever, adjustable into and out of relation to be shifted by respective sets of cams on said wheel.

24. In an apparatus of the character described, in combination, variable speed power transmission mechanism including a propeller shaft having two power transmitting members rotatable therewith, a jack shaft having gears, two rock levers, each pivoted beside said shafts on an axis extending transversely to said shafts, a cam wheel oscillatable on an axis parallel to and between the axes of said levers, said wheel having four circumferentially related sets of two superposed cams, the throw of one cam of each set being greater than that of the other, each of said levers having an arm extending between said shafts coupled for shifting said power transmitting members, respectively, to cause driving or non-driving of said propeller shaft, and two lever rocking position selector dogs for each rock lever, adjustable into and out of relation to be shifted by respective sets of cams on said wheel, control rods extending transversely of said shafts and supporting said dogs, respectively, and means for adjusting the control rods of the dogs of each of said levers simultaneously in opposite directions, including control cams for adjusting the rods of the dogs of one lever in predetermined relation to those of the other lever.

25. In an apparatus of the character described, in combination, variable speed power transmission mechanism including a power transmitting member shiftable to different positions, mechanism, including an oscillatable driving element and an oscillatable driven element, for shifting said member, shift transmitting devices, oscillatable with said respective elements, and adjustable to different positions relative to each other, and means for setting said devices in adjustable relations selective of either of the directions of oscillatory movement of said driving element for shifting said driven element to either of said different positions.

26. In an apparatus of the character described, in combination, variable speed power transmission mechanism including a power transmitting member shiftable to different positions, mechanism, including an oscillatable driving element and an oscillatable driven element, for shifting said member, shift transmitting devices, oscillatable with said respective elements, and adjustable to different positions relative to each other, and means for setting said devices in adjustable relations selective of either of the directions of oscillatory movement of said driving element for shifting said driven element, said last mentioned means including a plurality of operator controls, one operatively connected to adjust said devices which are oscillatable with said driven element, a second operatively connected to move said driving element in one direction of oscillation, and a third operatively connected to move said driving element in the opposite direction.

27. In an apparatus of the character described, in combination, variable speed power transmission mechanism including a power transmitting member shiftable to different positions, a shift lever operatively connected to shift said member, two dogs shiftable with and adjustable relative to said lever, two oscillatable sets of cams of unequal throw, means for oscillating said cams at will, and means for selectively adjusting said dogs for being actuated by either forward or reverse movement of said cams.

28. In an apparatus of the character described, in combination, variable speed power transmission mechanism including a power transmitting member shiftable to different positions, a shift lever operatively connected to shift said member, two dogs shiftable with and adjustable relative to said lever, two oscillatable sets of cams of unequal throw, means for oscillating said cams at will, means for selectively adjusting said dogs for being actuated by either forward or reverse movement of said cams, a clutch, a spring for throwing in said clutch, a clutch pedal operatively connected for throwing out said clutch and for actuating said cams in one direction, and a supplementary pedal for actuating said cams in the opposite direction.

29. In an apparatus of the character described, in combination, variable speed power transmission mechanism including a power transmitting member shiftable to different positions, a shift lever operatively connected to shift said member, two dogs shiftable with said lever and disposed at different points around the fulcrum of said lever, successive sets of dog-shifting cams of unequal throw mounted for movement relative to said lever, and controllable means for adjusting said dogs into and out of the paths of said cams.

30. In an apparatus of the character described, in combination, variable speed power transmission mechanism including a power transmitting member shiftable to different positions, a shift lever operatively connected to shift said member, two dogs shiftable with said lever and disposed at different points around the fulcrum of said lever, successive sets of dog-shifting cams mounted for movement relative to said lever, and controllable means for adjusting said dogs into and out of the paths of said cams, said means including devices for restraining said dogs from movement from adjusted position relative to said lever under pressure of said cams.

31. In an apparatus of the character described, in combination, variable speed power transmission mechanism including a power transmitting member shiftable to different positions, a shift lever operatively connected to shift said member, two dogs shiftable with said lever and disposed at different points around the fulcrum of said lever, successive sets of dog-shifting cams mounted for movement relative to said lever, controllable means for adjusting said dogs into and out of the paths of said cams, said means including devices for restraining said dogs from movement from adjusted position relative to said lever under pressure of said cams, and means connecting said dogs to each other for simultaneous adjustable movement independent of movement of said cams.

32. In an apparatus of the character described, in combination, variable speed power transmission mechanism including a power transmitting member shiftable to different positions, a shift lever operatively connected to shift said member, two dogs shiftable with said lever and disposed at different points around the fulcrum of said lever, successive sets of dog-shifting cams mounted for movement relative to said lever, controllable means for adjusting said dogs into and out of the paths of said cams, and means connecting said dogs to each other for simultaneous adjustable movement independent of movement of said cams.

33. In an apparatus of the character described, in combination, variable speed power transmission mechanism including a power transmitting member shiftable to different positions, a shift lever operatively connected to shift said member, dogs shiftable with said lever, cams for shifting said dogs, means for adjusting said dogs, at will, into and out of the path of said cams, said means including devices for restraining the dogs from movement from adjusted position relative to said lever under pressure of said cams, and means connecting said dogs to each other for simultaneous adjustable movement independent of movement of said cams.

34. In an apparatus of the character described, in combination, variable speed transmission mechanism including a power transmitting member shiftable to different positions, member shifting mechanism including a shift lever, two lever-shifting dogs connected to oscillate with said lever and adjustable relative to said lever, and means connecting said dogs for simultaneous adjustable movement with each other in all positions of said lever.

35. In an apparatus of the character described, in combination, variable speed transmission mechanism including a power transmitting member shiftable to different positions, member shifting mechanism including a shift lever, two dogs each operatively connected to shift said lever, and means connecting said dogs for simultaneous adjustable movement in opposite directions relative to each other and relative to said lever in all positions of said lever.

36. In an apparatus of the character described, in combination, variable speed transmission mechanism including a power transmitting member shiftable to different positions, member shifting mechanism including a shift lever, two lever-shifting dogs connected to oscillate with said lever and adjustable relative to said lever, means connecting said dogs for simultaneous adjustable movement with each other in all positions of said lever, and a plurality of sets of different throw, dog-shifter cams, simultaneously movable in paths intersecting certain of the adjustable positions of said dogs.

37. In an apparatus of the character described, in combination, variable speed transmission mechanism including a power transmitting member shiftable to different positions, member shifting mechanism including a shift lever, two lever-shifting dogs connected to oscillate with said lever and adjustable relative to said lever, means connecting said dogs for simultaneous adjustable movement with each other in all positions of said lever, a plurality of sets of different throw, dog-shifter cams, simultaneously movable in paths intersecting certain of the adjustable positions of said dogs, and a pedal connected to actuate said cams at will.

38. In an apparatus of the character described, in combination, variable speed transmission mechanism including a power transmitting member shiftable to different positions, member shifting mechanism including a shift lever, two lever-shifting dogs connected to oscillate with said lever and adjustable relative to said lever transversely of the path of oscillation of said lever, and a plurality of sets of different throw, dog-shifter cams mounted for rotative movement in a plane parallel to that of oscillation of said lever, the paths of said cams overlapping the oscillatory paths of said dogs.

39. In a variable transmission mechanism, a casing, a shiftable speed controlling gear within said casing, a pivoted controller arm within said casing for moving said gear, said controller arm being at all times engageable with said gear thereunder, and means within said casing for moving said arm, said means including a rotatable member having cam surfaces for moving said arm, said surfaces being adapted to engage said arm only during movement thereof by said surfaces, said arm including adjustable dogs for selective engagement with said surfaces.

40. In a variable transmission mechanism, including a housing and a plurality of shiftable speed controlling gears within said housing, the combination of a pivotally mounted controller arm for each of said gears, said arms being mounted within said housing and permanently engaging their respective gears, and means within said housing for controlling said arms, said arms including movable members and controllers therefor for selectively moving said arms by said means.

41. In a variable transmission mechanism, including a housing and a plurality of shiftable speed controlling gears within said housing, the combination of a pivotally mounted controller arm for each of said gears, said arms being mounted within said housing and permanently engaging their respective gears, and means within said housing for controlling said arms, said arms including movable members for selectively moving said arms by said means, said members being externally adjustable.

42. In a variable transmission mechanism, including a housing and a plurality of shiftable speed controlling gears within said housing, the combination of a pivotally mounted controller arm for each of said gears, said arms being mounted within said housing and permanently engaging their respective gears, and means within said housing for controlling said arms, said arms including movable members for selectively moving said arms by said means, said members being externally adjustable, said means including a cam wheel movable upon operation of a clutching mechanism.

43. In a device of the character described, a housing, a speed controlling gear within said housing, a rockable arm controlling said gear, and means within said housing for rocking said arm in response to operation of an associated clutching mechanism, said means comprising a rotatable element selectively engageable with said arm, said element including cam surfaces engageable with said arm only upon movement thereof by said element, said arms including adjustable elements for controlling movement of said arms by said rotatable element.

44. In a device of the character described, a housing, a speed controlling gear within said housing, a rockable arm controlling said gear, and means within said housing for rocking said arm in response to operation of an associated clutching mechanism, said means comprising a rotatable element selectively engageable with said arm, said element including cam surfaces engageable with said arm only upon movement thereof by said element, said arms including adjustable elements for controlling movement of said arms by said rotatable element, said members being externally adjustable.

45. In a device of the character described, a housing, a speed controlling gear within said housing, a rockable arm controlling said gear, and means within said housing for rocking said arm in response to operation of an associated clutching mechanism, said means comprising a rotatable element selectively engageable with said arm, said element including cam surfaces engageable with said arm only upon movement thereof by said element, said arms including adjustable elements for controlling movement of said arms by said rotatable element, said members being externally adjustable during the disengagement of said arm by said cam surfaces.

In testimony whereof I affix my signature.

JOHN V. PATTERSON.